United States Patent
Zhou

(10) Patent No.: US 9,832,029 B2
(45) Date of Patent: *Nov. 28, 2017

(54) POLICY CONTROL METHOD AND DEVICE

(71) Applicant: Huawei Technologies Co., Ltd., Shenzhen (CN)

(72) Inventor: Junping Zhou, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/265,474

(22) Filed: Sep. 14, 2016

(65) Prior Publication Data

US 2017/0005812 A1 Jan. 5, 2017

Related U.S. Application Data

(63) Continuation of application No. 14/085,116, filed on Nov. 20, 2013, now Pat. No. 9,473,595, which is a
(Continued)

(51) Int. Cl.
*G06F 15/177* (2006.01)
*H04L 12/14* (2006.01)
(Continued)

(52) U.S. Cl.
CPC ...... *H04L 12/1407* (2013.01); *H04L 61/2007* (2013.01); *H04L 61/2503* (2013.01);
(Continued)

(58) Field of Classification Search
CPC .......... H04L 12/1407; H04L 61/2557–61/256; H04L 69/00
See application file for complete search history.

(56) References Cited

U.S. PATENT DOCUMENTS

| 2006/0215649 A1* | 9/2006 | Morrall ............ H04L 29/12009 370/389 |
| 2012/0084246 A1 | 4/2012 | Zhou et al. |
| 2014/0269740 A1 | 9/2014 | Garneij et al. |

FOREIGN PATENT DOCUMENTS

| CN | 1893394 A | 1/2007 |
| CN | 101222343 A | 7/2008 |

(Continued)

OTHER PUBLICATIONS

"3rd Generation Partnership Project; Technical Specification Group Services and System Aspects; Policy and charging control architecture (Release 9)," 3GPP TS 23.203, V9.8.0, pp. 1-122, 3rd Generation Partnership Project, Valbonne, France (Mar. 2011).
"3GPP TS 23.203—3rd Generation Partnership Project; Technical Specification Group Services and System Aspects; Policy and charging control architecture (Release 10)," Version 10.2.0, 3rd Generation Partnership Project, Valbonne, France (Dec. 2010).
(Continued)

*Primary Examiner* — Brendan Higa
(74) *Attorney, Agent, or Firm* — Leydig, Voit & Mayer, Ltd.

(57) ABSTRACT

Embodiments of the present invention relate to a policy control method and device. The method includes: receiving, by a PCRF, NAT entry information sent by a NAT device; obtaining, by the PCRF, a first PCC rule according to the NAT entry information, where the first PCC rule is a PCC rule including an IP address to be translated by the NAT device; and sending, by the PCRF, the first PCC rule to a gateway device, so that the gateway device executes the first PCC rule. According to the embodiments of the present invention, it can be ensured that the gateway device correctly executes the PCC rule.

12 Claims, 5 Drawing Sheets

Related U.S. Application Data continuation of application No. PCT/CN2011/074675, filed on May 25, 2011.

(51) Int. Cl.
*H04L 29/12* (2006.01)
*H04M 15/00* (2006.01)
*H04W 4/24* (2009.01)
*H04L 29/06* (2006.01)

(52) U.S. Cl.
CPC ...... *H04L 61/2507* (2013.01); *H04L 65/1069* (2013.01); *H04L 69/03* (2013.01); *H04M 15/66* (2013.01); *H04W 4/24* (2013.01); *H04L 61/251* (2013.01); *H04L 61/2557* (2013.01); *H04L 61/2585* (2013.01)

(56) References Cited

FOREIGN PATENT DOCUMENTS

| | | |
|---|---|---|
| CN | 101420674 A | 4/2009 |
| CN | 101471797 A | 7/2009 |
| CN | 101771605 A | 7/2010 |
| EP | 2217018 A1 | 8/2010 |

OTHER PUBLICATIONS

"3GPP TR 23.975—3rd Generation Partnership Project; Technical Specification Group Services and System Aspects; 1 Pv6 Migration Guidelines (Release 10)," Version 1.2.0, 3rd Generation Partnership Project, Valbonne, France (Oct. 2010).

\* cited by examiner

POLICY CONTROL METHOD AND DEVICE

CROSS-REFERENCE TO RELATED APPLICATIONS

This application is a continuation of U.S. patent application Ser. No. 14/085,116, filed on Nov. 20, 2013, which is a continuation of International Patent Application No. PCT/CN2011/074675, filed on May 25, 2011. The afore-mentioned patent applications are hereby incorporated by reference in their entireties.

TECHNICAL FIELD

Embodiments of the present invention relate to the field of communications technologies, and in particular, to a policy control method and device.

BACKGROUND

With the popularity of Internet technologies, the number of terminal devices increases rapidly, and each terminal device needs to obtain a valid Internet protocol (IP) address (such as, IPv4 address) when communicating with the Internet; therefore, valid IP addresses become scarce resources. To solve insufficiency of valid IP addresses, a built-in or an external network address translation (NAT) device on a gateway device may be used to establish NAT entry information, so as to translate a group of IP address information into another group of IP address information, for example, translate a group of private IP addresses (such as, IPv6 address) and private network port numbers of a local area network into valid IP addresses (such as, IPv4 address) and public network port numbers of the Internet.

A policy and charging control (PCC) architecture defined by the 3rd generation partnership project (3GPP) may be mainly formed by an application function entity (AF), a policy and charging rules function entity (PCRF), and a policy and charging enforcement function entity (PCEF). The PCRF receives application-layer session information that is dynamically provided by the AF, generates corresponding PCC rules according to the session information, and delivers the PCC rules to the gateway device, so that the gateway device executes these PCC rules.

However, after the NAT device is introduced, the AF can only identify an IP address (such as, IPv4 address) obtained through translating by the NAT device, while the gateway device can only identify an IP address (such as, IPv6 address) to be translated by the NAT device; therefore, after the PCRF generates, according to the session information of the AF, a PCC rule including the IP address obtained through translating by the NAT device and delivers the PCC rule to the gateway device, the gateway device cannot identify the IP address in the PCC rule, thereby causing that the gateway device cannot execute the PCC rule.

SUMMARY

Embodiments of the present invention provide a policy control method and device, which are used to ensure that a gateway device correctly executes a PCC rule.

An embodiment of the present invention provides a policy control method, including:

receiving, by a PCRF, NAT entry information sent by a NAT device;

obtaining, by the PCRF, a first PCC rule according to the NAT entry information, where the first PCC rule is a PCC rule including an IP address to be translated by the NAT device; and sending, by the PCRF, the first PCC rule to a gateway device, so that the gateway device executes the first PCC rule.

An embodiment of the present invention provides another policy control method, including:

receiving, by a gateway device, NAT entry information sent by a NAT device;

receiving, by the gateway device, a first PCC rule sent by a PCRF, where the first PCC rule is a PCC rule including an IP address obtained through translating by the NAT device;

translating, by the gateway device, the first PCC rule into a second PCC rule according to the NAT entry information, where the second PCC rule is a PCC rule including an IP address to be translated by the NAT device; and executing, by the gateway device, the second PCC rule.

An embodiment of the present invention further provides a PCRF, including:

a receiving unit, configured to receive NAT entry information sent by a NAT device;

an obtaining unit, configured to obtain a first PCC rule according to the NAT entry information, where the first PCC rule is a PCC rule including an IP address to be translated by the NAT device; and a sending unit, configured to send the first PCC rule to a gateway device, so that the gateway device executes the first PCC rule.

An embodiment of the present invention further provides a gateway device, including:

a first receiving unit, configured to receive NAT entry information sent by a NAT device;

a second receiving unit, configured to receive a first PCC rule sent by a PCRF, where the first PCC rule is a PCC rule including an IP address obtained through translating by the NAT device;

a translating unit, configured to translate the first PCC rule into a second PCC rule according to the NAT entry information, where the second PCC rule is a PCC rule including an IP address to be translated by the NAT device; and an executing unit, configured to execute the second PCC rule.

It can be seen from the foregoing technical solutions that, in the embodiments of the present invention, the PCC rule including the IP address obtained through translating by the NAT device can be translated, according to the NAT entry information, into the PCC rule including the IP address to be translated by the NAT device, or the PCC rule including the IP address to be translated by the NAT device can be obtained according to the NAT entry information, thereby ensuring that the gateway device correctly executes the PCC rule.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and persons of ordinary skill in the art may further obtain other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1A:
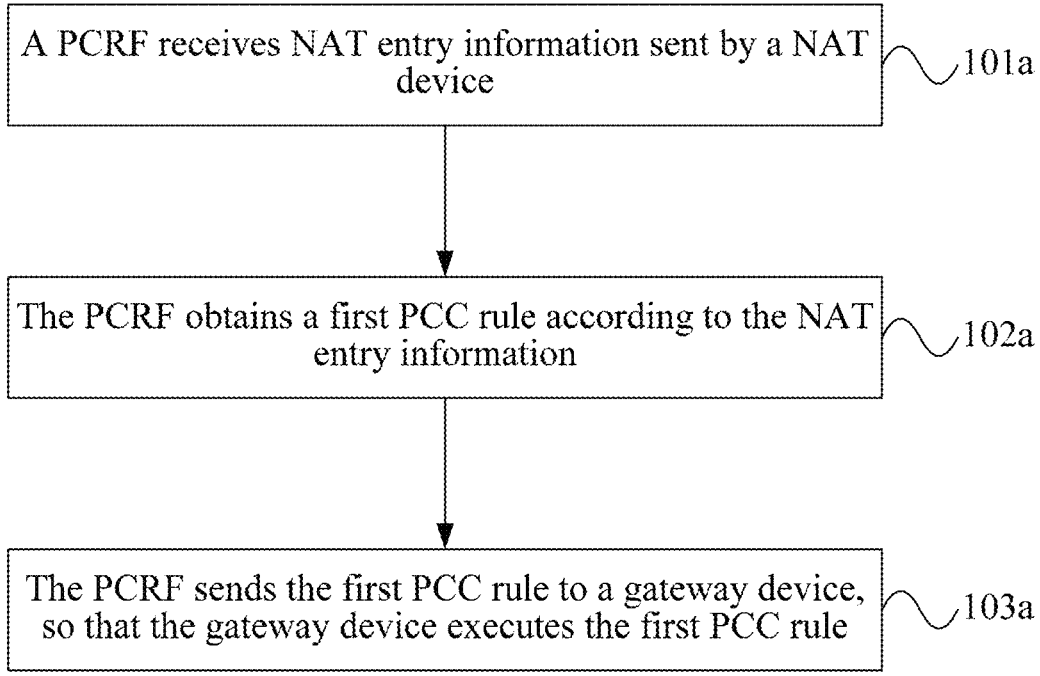
FIG. 1a is a schematic flow chart of a policy control method according to an embodiment of the present invention.

FIG. 1a is a schematic flow chart of a policy control method according to an embodiment of the present invention. As shown in FIG. 1a, the policy control method in this embodiment may include the following steps:

101a: A PCRF receives NAT entry information sent by a NAT device.

The NAT entry information may include information related to an address to be translated by the NAT device, and information related to an address obtained through translating by the NAT device, for example, the NAT entry information may include a source IP address (a source IP address before translation and a source IP address after translation), a protocol type, and a source port number (a private network source port number before translation and a public network source port number after translation).

Optionally, the PCRF may specifically receive NAT entry information that is directly sent by the NAT device to the PCRF.

Optionally, the PCRF may also specifically receive NAT entry information that is sent by the NAT device through a gateway device to the PCRF.

Optionally, the PCRF may also specifically receive NAT entry information that is sent by the NAT device through an AF to the PCRF.

102a: The PCRF obtains a first PCC rule according to the NAT entry information, where the first PCC rule is a PCC rule including an IP address to be translated by the NAT device.

Optionally, the PCRF may specifically translate a generated second PCC rule into a first PCC rule according to the NAT entry information, where the second PCC rule is a PCC rule including an IP address obtained through translating by the NAT device.

Optionally, the PCRF may also specifically obtain, according to the NAT entry information, an IP address to be translated by the NAT device, and generate a first PCC rule according to the IP address to be translated by the NAT device.

103a: The PCRF sends the first PCC rule to a gateway device, so that the gateway device executes the first PCC rule.

In this embodiment, the NAT device may be built in the gateway device, or may also be disposed external to the gateway device, which is not limited in the embodiment of the present invention.

In this embodiment, the PCRF receives the NAT entry information sent by the NAT device, and obtains, according to the NAT entry information, the PCC rule including the IP address to be translated by the NAT device, so that the PCRF can send the obtained PCC rule to the gateway device, thereby ensuring that the gateway device can correctly execute the PCC rule.

The policy control method in this embodiment may be applied to various communication systems, such as, a code division multiple access (Code Division Multiple Access, CDMA) system, a wideband code division multiple access (Wideband Code Division Multiple Access, WCDMA) system, a general packet radio service (General Packet Radio Service, GPRS) system, and a long term evolution (Long Term Evolution, LTE) system.

The gateway device may be a gateway GPRS supporting node (GGSN) in the CDMA system, the WCDMA system, and the GPRS system, and may also be a network element in the LTE system, such as a packet data network gateway (PGW) and an evolved packet data gateway (ePDG).

Figure 1B:
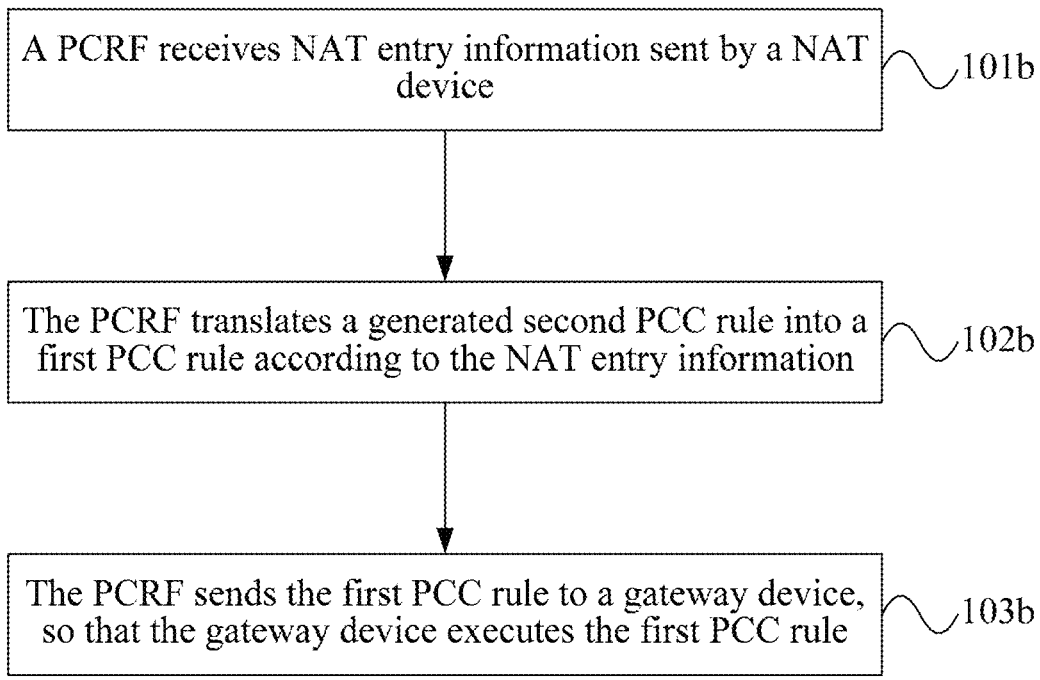
FIG. 1b is a schematic flow chart of a policy control method according to another embodiment of the present invention.

FIG. 1b is a schematic flow chart of a policy control method according to another embodiment of the present invention. As shown in FIG. 1b, a PCRF may specifically translate a generated second PCC rule into a first PCC rule according to NAT entry information, where the first PCC rule is a PCC rule including an IP address to be translated by a NAT device, and the second PCC rule is a PCC rule including an IP address obtained through translating by the NAT device. Specifically, the following may be included:

101b: A PCRF receives NAT entry information sent by a NAT device.

The NAT entry information may include information related to an address to be translated by the NAT device, and information related to an address obtained through translating by the NAT device, for example, the NAT entry information may include a source IP address (a source IP address before translation and a source IP address after translation), a protocol type, and a source port number (a private network source port number before translation and a public network source port number after translation).

102b: The PCRF translates a generated second PCC rule into a first PCC rule according to the NAT entry information, where the second PCC rule is a PCC rule including an IP address obtained through translating by the NAT device, and the first PCC rule is a PCC rule including an IP address to be translated by the NAT device.

103b: The PCRF sends the first PCC rule to a gateway device, so that the gateway device executes the first PCC rule.

In this embodiment, the PCRF receives the NAT entry information of the NAT device that is sent by the NAT device, and translates, according to the NAT entry information, the generated second PCC rule including the IP address obtained through translating by the NAT device into the first PCC rule including the IP address to be translated by the NAT device, so that the PCRF can send the first PCC rule obtained through translating to the gateway device, thereby ensuring that the gateway device can correctly execute the PCC rule.

Figure 2:
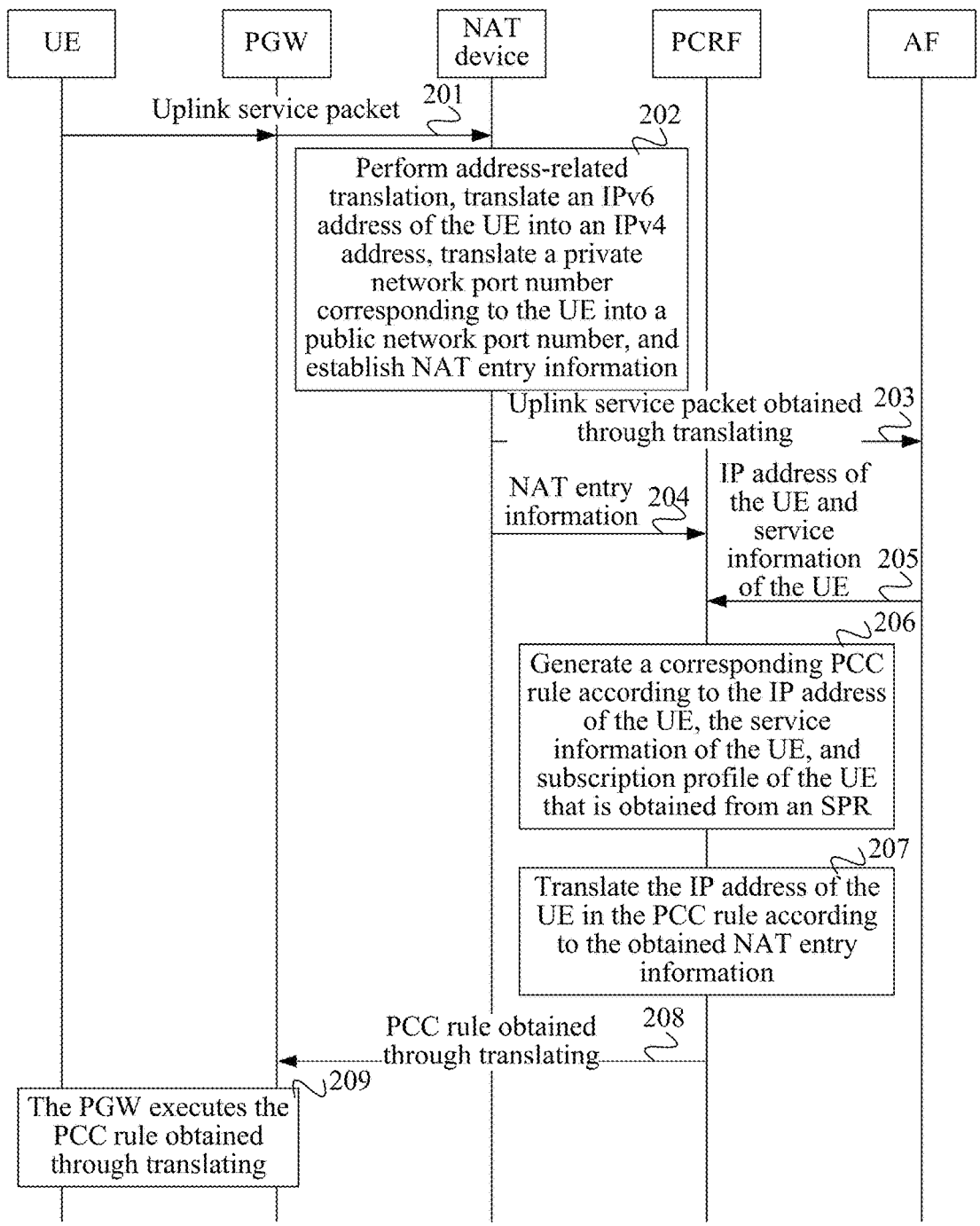
FIG. 2 is a schematic flow chart of a policy control method according to another embodiment of the present invention.

In order to make the methods provided by the embodiments of the present invention more comprehensible, the following takes an LTE system as an example. FIG. 2 is a schematic flow chart of a policy control method according to another embodiment of the present invention. In this embodiment, a PGW allocates an IPv6 address to a user equipment (UE), and the UE needs to initiate a service to an AF having an address of an IPv4 format. As shown in FIG. 2, the policy control method in this embodiment may include the following steps:

201: A UE sends an uplink service packet to a NAT device through a PGW, where the uplink service packet includes a source IP address (an IPv6 address of the UE), a destination IP address (a specific IPv6 address including an IPv4 address of an AF), a protocol type, a source port number (a private network port number corresponding to the UE), and a destination port number (a port number corresponding to the AF).

Before 201, the UE may request domain name resolution of the AF from a domain name system (DNS), and the DNS returns a specific IPv6 address to the UE, where the specific IPv6 address includes the IPv4 address of the AF.

202: The NAT device performs address-related translation, translates the IPv6 address of the UE into an IPv4 address, translates the private network port number corresponding to the UE into a public network port number, and establishes NAT entry information, where the NAT entry information includes a source IP address (the IPv6 address of the UE before translation and the IPv4 address after translation), the protocol type, and a source port number (the private network port number corresponding to the UE before translation and the public network port number after translation).

203: The NAT sends the uplink service packet obtained through translating to the AF, where the uplink service packet obtained through translating includes a source IP address (the IPv4 address of the UE), the destination IP address (the IPv4 address of the AF), the protocol type, a source port number (the public network port number corresponding to the UE), and the destination port number (the port number corresponding to the AF).

204: The NAT sends the established NAT entry information to a PCRF.

Optionally, the NAT may also send the established NAT entry information to a PCRF through the PGW or the AF.

It should be noted that, 203 and 204 are not performed in a fixed sequence.

205: The AF sends an IP address (the IPv4 address obtained through translating by the NAT device) of the UE and service information of the UE to the PCRF.

206: The PCRF generates a corresponding PCC rule according to the IP address (the IPv4 address obtained through translating by the NAT device) of the UE, the service information of the UE, and subscription profile of the UE that is obtained from a subscription profile repository (SPR), where the PCC rule includes the IP address (the IPv4 address obtained through translating by the NAT device) of the UE.

207: The PCRF translates the IP address of the UE in the PCC rule according to the obtained NAT entry information, that is, translates the IPv4 address into a corresponding IPv6 address.

208: The PCRF sends the PCC rule obtained through translating to the PGW.

209: The PGW executes the obtained PCC rule obtained through translating.

Specifically, the AF sends a downlink service packet (that is, a response packet of the uplink service packet) to the UE through the NAT device and the PGW. The downlink service packet sent by the AF includes a source IP address (the IPv4 address of the AF), a destination IP address (the IPv4 address of the UE), the protocol type, a source port number (the port number corresponding to the AF), and a destination port number (the public network port number corresponding to the UE). After matching performed by the NAT device according to the established NAT entry information, the downlink service packet received by the PGW includes a source IP address (the specific IPv6 address including the IPv4 address of the AF), a destination IP address (the IPv6 address of the UE), the protocol type, the source port number (the port number corresponding to the AF), and a destination port number (the private network port number corresponding to the UE). Then, the PGW maps, according to the obtained PCC rule obtained through translating, and the IP address (the IPv6 address obtained through translating by the NAT device) of the UE that is included in the PCC rule, the received downlink service packet to a bearer corresponding to the PCC rule for transmission.

In this embodiment, the PCRF receives the NAT entry information that is sent by the NAT device directly or indirectly (through the PGW or the AF), and translates, according to the NAT entry information, a generated PCC rule including an IP address obtained through translating by the NAT device into a PCC rule including an IP address to be translated by the NAT device, so that the PCRF can send the PCC rule obtained through translating to the gateway device, thereby ensuring that the gateway device can correctly execute the PCC rule.

Figure 7:
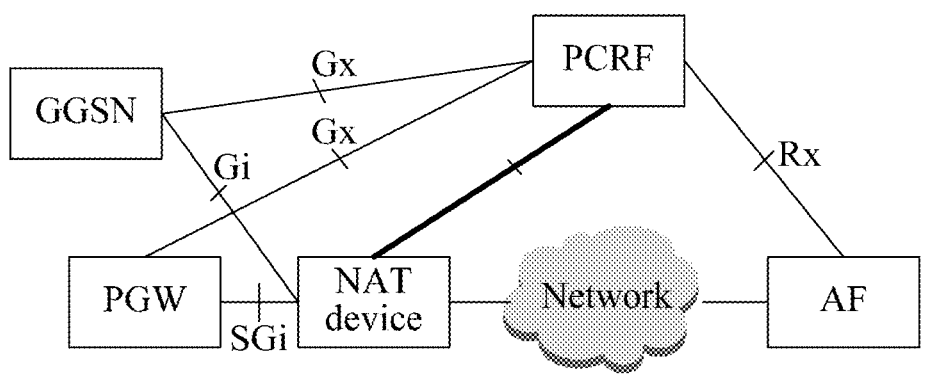
FIG. 7 is a schematic diagram of a PCC architecture to which the embodiments corresponding to FIG. 1a, FIG. 1b, and FIG. 2 are applicable.

FIG. 7 is a schematic diagram of a PCC architecture to which the embodiments corresponding to FIG. 1a, FIG. 1b, and FIG. 2 are applicable. An interface between a NAT device and a PCRF is newly added. NAT entry information is transmitted to the PCRF device through the newly added interface between the NAT device and the PCRF, so that the PCRF may complete translation of a PCC rule, or translation of an IP address, and deliver an identifiable rule to a gateway.

Figure 3:
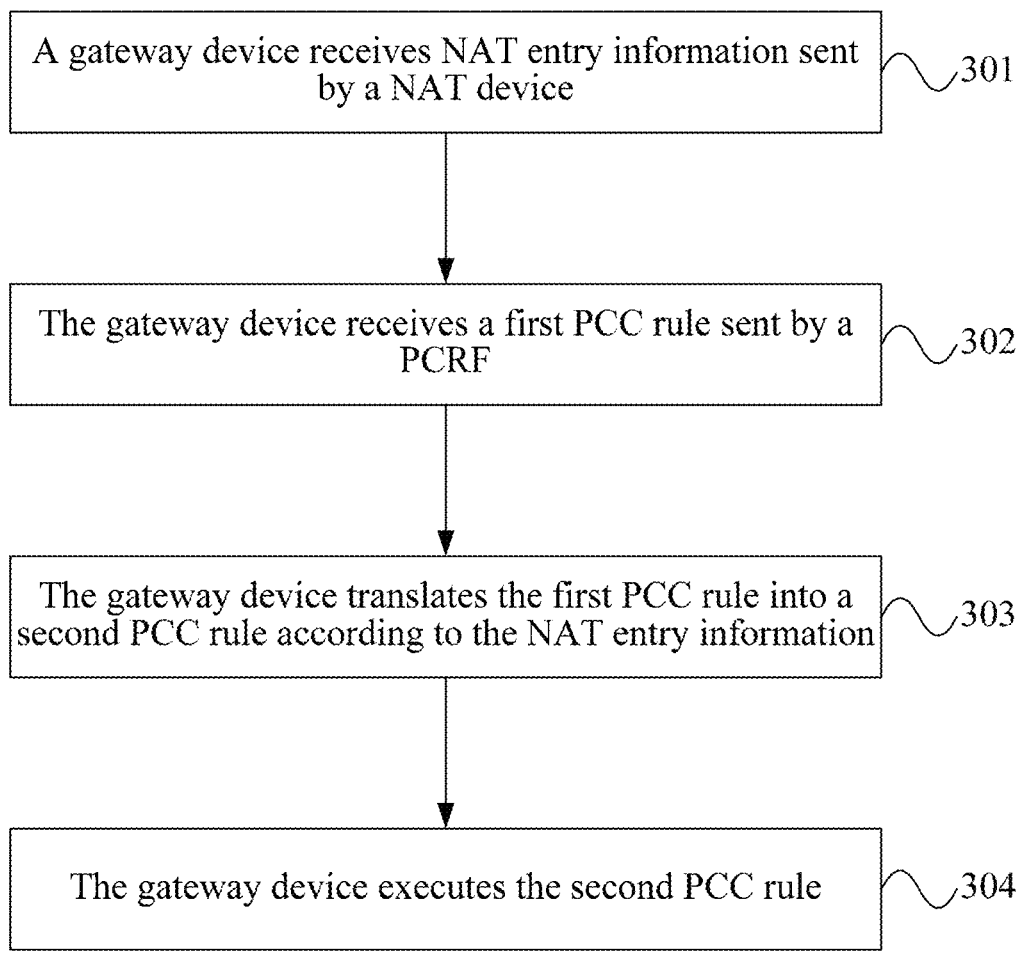
FIG. 3 is a schematic flow chart of another policy control method according to another embodiment of the present invention.

FIG. 3 is a schematic flow chart of another policy control method according to another embodiment of the present invention. As shown in FIG. 3, the policy control method in this embodiment may include the following steps:

301: A gateway device receives NAT entry information sent by a NAT device.

The NAT entry information may include information related to an address to be translated by the NAT device, and information related to an address obtained through translating by the NAT device, for example, the NAT entry information may include a source IP address (a source IP address before translation and a source IP address after translation), a protocol type, and a source port number (a private network source port number before translation and a public network source port number after translation).

302: The gateway device receives a first PCC rule sent by a PCRF, where the first PCC rule is a PCC rule including an IP address obtained through translating by the NAT device.

The first PCC rule is generated by the PCRF.

303: The gateway device translates the first PCC rule into a second PCC rule according to the NAT entry information, where the second PCC rule is a PCC rule including an IP address to be translated by the NAT device.

304: The gateway device executes the second PCC rule.

In this embodiment, the NAT device may be built in the gateway device, or may also be disposed external to the gateway device, which is not limited in the embodiment of the present invention.

In this embodiment, the gateway device receives the NAT entry information sent by the NAT device, and translates, according to the NAT entry information, the received first PCC rule including the IP address obtained through translating by the NAT device into the second PCC rule including the IP address to be translated by the NAT device, thereby ensuring that the gateway device can correctly execute the PCC rule.

The policy control method in this embodiment may be applied to various communication systems, such as, a code division multiple access (CDMA) system, a wideband code division multiple access (WCDMA) system, a general packet radio service (GPRS) system, and a long term evolution (LTE) system.

The gateway device may be a gateway GPRS supporting node (GGSN) in the CDMA system, the WCDMA system, and the GPRS system, and may also be a network element in the LTE system, such as a packet data network gateway (PGW) and an evolved packet data gateway (ePDG).

Figure 4:
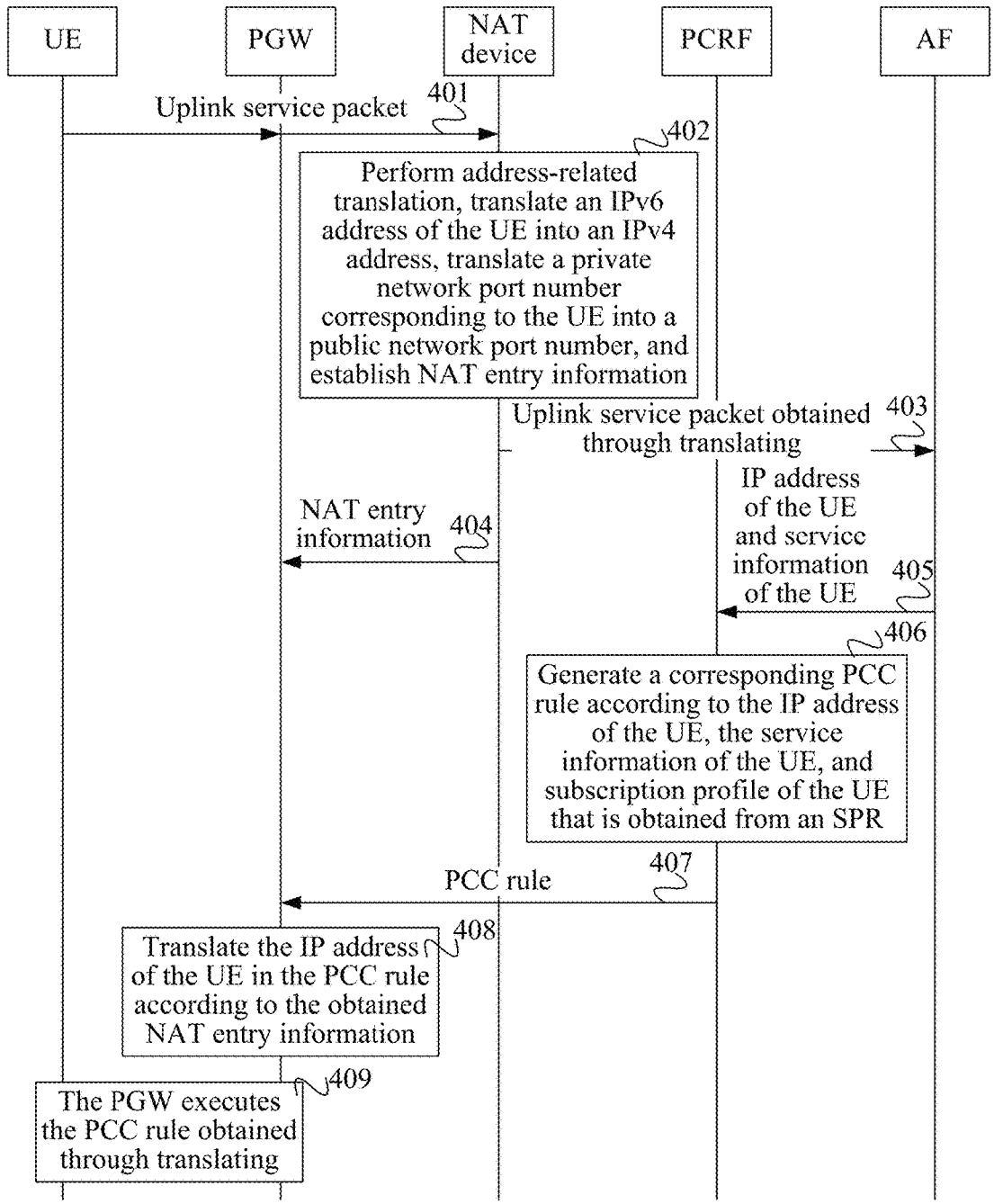
FIG. 4 is a schematic flow chart of another policy control method according to another embodiment of the present invention.

In order to make the methods provided by the embodiments of the present invention more comprehensible, the following takes an LTE system as an example. FIG. 4 is a schematic flow chart of another policy control method according to another embodiment of the present invention. In this embodiment, a PGW allocates an IPv6 address to a user equipment (UE), and the UE needs to initiate a service to an AF having an address of an IPv4 format. As shown in FIG. 4, the policy control method in this embodiment may include the following steps:

401: A UE sends an uplink service packet to a NAT device through a PGW, where the uplink service packet includes a source IP address (an IPv6 address of the UE), a destination IP address (a specific IPv6 address including an IPv4 address of an AF), a protocol type, a source port number (a private network port number corresponding to the UE), and a destination port number (a port number corresponding to the AF).

Before 401, the UE may request domain name resolution of the AF from a domain name system (DNS), and the DNS returns a specific IPv6 address to the UE, where the specific IPv6 address includes the IPv4 address of the AF.

402: The NAT device performs address-related translation, translates the IPv6 address of the UE into an IPv4 address, translates the private network port number corresponding to the UE into a public network port number, and establishes NAT entry information, where the NAT entry information includes a source IP address (the IPv6 address of the UE before translation and the IPv4 address after translation), the protocol type, and a source port number (the private network port number corresponding to the UE before translation and the public network port number after translation).

403: The NAT sends the uplink service packet obtained through translating to the AF, where the uplink service packet obtained through translating includes a source IP address (the IPv4 address of the UE), the destination IP address (the IPv4 address of the AF), the protocol type, a source port number (the public network port number corresponding to the UE), and the destination port number (the port number corresponding to the AF).

404: The NAT sends the established NAT entry information to the PGW.

It should be noted that, 403 and 404 are not performed in a fixed sequence.

405: The AF sends an IP address (the IPv4 address obtained through translating by the NAT device) of the UE and service information of the UE to a PCRF.

406: The PCRF generates a corresponding PCC rule according to the IP address (the IPv4 address obtained through translating by the NAT device) of the UE, the service information of the UE, and subscription profile of the UE that is obtained from a subscription profile repository (SPR), where the PCC rule includes the IP address (the IPv4 address obtained through translating by the NAT device) of the UE.

407: The PCRF sends the generated PCC rule to the PGW.

408: The PGW translates the IP address of the UE in the PCC rule according to the obtained NAT entry information, that is, translates the IPv4 address into a corresponding IPv6 address.

409: The PGW executes the PCC rule obtained through translating.

Specifically, the AF sends a downlink service packet (that is, a response packet of the uplink service packet) to the UE through the NAT device and the PGW. The downlink service packet sent by the AF includes a source IP address (the IPv4 address of the AF), a destination IP address (the IPv4 address of the UE), the protocol type, a source port number (the port number corresponding to the AF), and a destination port number (the public network port number corresponding to the UE). After matching performed by the NAT device according to the established NAT entry information, the downlink service packet received by the PGW includes a source IP address (the specific IPv6 address including the IPv4 address of the AF), a destination IP address (the IPv6 address of the UE), the protocol type, the source port number (the port number corresponding to the AF), and a destination port number (the private network port number corresponding to the UE). Then, the PGW maps, according to the PCC rule obtained through translating, and the IP address (the IPv6 address obtained through translating by the NAT device) of the UE that is included in the PCC rule, the received downlink service packet to a bearer corresponding to the PCC rule for transmission.

In this embodiment, the PGW receives the NAT entry information that is directly sent by the NAT device, and translates, according to the NAT entry information, a received PCC rule including an IP address obtained through translating by the NAT device into a PCC rule including an IP address to be translated by the NAT device, thereby ensuring that the PGW can correctly execute the PCC rule.

It should be noted that, to simplify the description, the foregoing method embodiments are described as a series of action combinations. But persons skilled in the art should know that the present invention is not limited to any described sequence of actions, because some steps may adopt other sequences or may be performed simultaneously according to the described embodiments of the present invention. Moreover, persons skilled in the art should know that the embodiments described in the specification all belong to exemplary embodiments, and the involved actions and modules are not necessary for the present invention.

In the foregoing embodiments, the description of each embodiment has its emphasis, and for a part not described in detail in a certain embodiment, reference may be made to related description in other embodiments.

Figure 5:
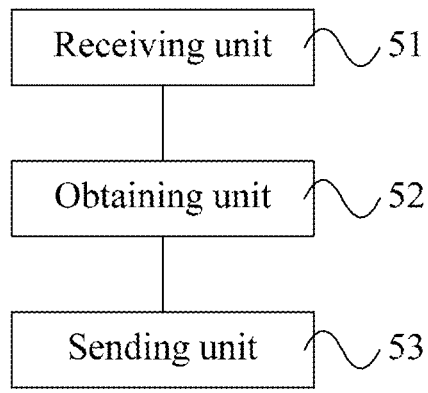
FIG. 5 is a schematic structural diagram of a PCRF according to another embodiment of the present invention.

FIG. 5 is a schematic structural diagram of a PCRF according to another embodiment of the present application. As shown in FIG. 5, the PCRF in this embodiment may include a receiving unit 51, an obtaining unit 52, and a sending unit 53. The receiving unit 51 is configured to receive NAT entry information sent by a NAT device; the obtaining unit 52 is configured to obtain a first PCC rule according to the NAT entry information, where the first PCC rule is a PCC rule including an IP address to be translated by the NAT device; and the sending unit 53 is configured to send the first PCC rule to a gateway device, so that the gateway device executes the first PCC rule.

Functions of the PCRFs in the embodiments corresponding to FIG. 1 and FIG. 2 may be implemented by the PCRF provided by this embodiment.

Optionally, the receiving unit 51 in this embodiment may specifically receive NAT entry information that is directly sent by the NAT device to the PCRF.

Optionally, the receiving unit 51 in this embodiment may also specifically receive NAT entry information that is sent by the NAT device through the gateway device to the PCRF.

Optionally, the receiving unit 51 in this embodiment may also specifically receive NAT entry information that is sent by the NAT device through an AF to the PCRF.

Optionally, the obtaining unit 52 in this embodiment may specifically translate a second PCC rule into the first PCC rule according to the NAT entry information, where the second PCC rule is a PCC rule including an IP address obtained through translating by the NAT device.

Optionally, the obtaining unit 52 in this embodiment may also specifically obtain, according to the NAT entry information, an IP address to be translated by the NAT device, and generate the first PCC rule according to the IP address to be translated by the NAT device.

In this embodiment, the PCRF receives, through the receiving unit, the NAT entry information sent by the NAT device, and then the obtaining unit obtains, according to the NAT entry information, the first PCC rule including the IP address to be translated by the NAT device, so that the sending unit can send the obtained first PCC rule to the gateway device, thereby ensuring that the gateway device can correctly execute the PCC rule.

Figure 6:
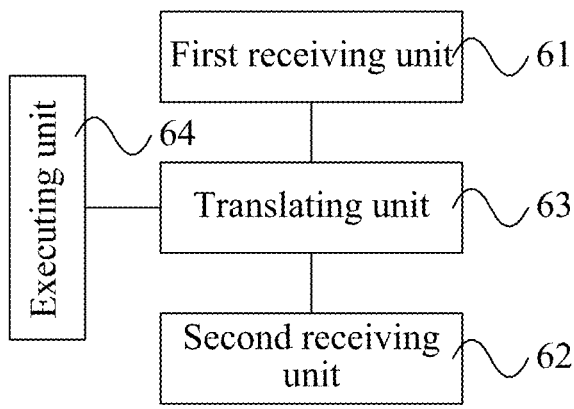
FIG. 6 is a schematic structural diagram of a gateway device according to another embodiment of the present invention.

FIG. 6 is a schematic structural diagram of a gateway device according to another embodiment of the present invention. As shown in FIG. 6, the gateway device in this embodiment may include a first receiving unit 61, a second receiving unit 62, a translating unit 63, and an executing unit 64. The first receiving unit 61 is configured to receive NAT entry information sent by a NAT device; the second receiving unit 62 is configured to receive a first PCC rule sent by a PCRF, where the first PCC rule is a PCC rule including an IP address obtained through translating by the NAT device; the translating unit 63 is configured to translate the first PCC rule into a second PCC rule according to the NAT entry information, where the second PCC rule is a PCC rule including an IP address to be translated by the NAT device; and the executing unit 64 is configured to execute the second PCC rule.

Functions of the gateway device in the embodiment corresponding to FIG. 3 and the PGW in the embodiment corresponding to FIG. 4 may be implemented by the gateway device provided by this embodiment.

In this embodiment, the NAT device may be built in the gateway device, or may also be disposed external to the gateway device, which is not limited in the embodiment of the present invention.

In this embodiment, the gateway device receives, through the first receiving unit, the NAT entry information sent by the NAT device, and then the translating unit translates, according to the NAT entry information, the first PCC rule which includes the IP address obtained through translating by the NAT device and is received by the second receiving unit into the second PCC rule including the IP address to be translated by the NAT device, thereby ensuring that the executing unit can correctly execute the PCC rule.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes any medium capable of storing program codes, such as a read-only memory (ROM), a random-access memory (RAM), a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or equivalent replacements to part of technical features of the technical solutions described in the foregoing embodiments; however, these modifications or replacements do not make the essence of the corresponding technical solutions depart from the spirit and scope of the technical solutions of the embodiments of the present invention.

What is claimed is:

1. A communications system comprising:
a policy and charging rules function (PCRF) entity comprising a processor configured to (a) receive network address translation (NAT) entry information from a NAT device, (b) translate a second policy and charging control (PCC) rule into a first PCC rule according to the NAT entry information, wherein the first PCC rule comprises an Internet Protocol version 6 (IPv6) address of a user equipment (UE) and the second PCC rule comprises an Internet Protocol version 4 (IPv4) address of the UE, and (c) send the first PCC rule; and
a gateway device configured to receive the first PCC rule from the PCRF entity and execute the first PCC rule.

2. The communications system according to claim 1, wherein the NAT entry information comprises a source IPv6 address, a source IPv4 address, a protocol type, a private network source port number before translation, and a public network source port number after translation.

3. The communications system according to claim 1, wherein the processor of the PCRF entity is further configured to receive the NAT entry information forwarded by an application function (AF) device.

4. The communications system according to claim 1, wherein the processor of the PCRF entity is further configured to receive the NAT entry information forwarded by the gateway device.

5. A communications system comprising:
a policy and charging rules function (PCRF) entity comprising a processor configured to (a) generate a first policy and charging control (PCC) rule, and (b) send the first PCC rule, wherein the first PCC rule comprises an Internet Protocol version 4 (IPv4) address of a user equipment (UE); and
a gateway device configured to (a) receive network address translation (NAT) entry information from a NAT device and the first PCC rule from the PCRF entity, (b) translate the first PCC rule into a second PCC rule according to the NAT entry information, wherein the second PCC rule comprises an Internet Protocol version 6 (IPv6) address of the UE, and (c) execute the second PCC rule.

6. The communications system according to claim 5, wherein the NAT entry information comprises a source IPv6 address, a source IPv4 address, a protocol type, a private network source port number before translation, and a public network source port number after translation.

7. A communications method comprising:
receiving, by a policy and charging rules function (PCRF) entity, network address translation (NAT) entry information from a NAT device;
translating, by the PCRF entity, a second policy and charging control (PCC) rule into a first PCC rule according to the NAT entry information, wherein the first PCC rule comprises an Internet Protocol version 6 (IPv6) address of a user equipment (UE) and the second PCC rule comprises an Internet Protocol version 4 (IPv4) address of the UE;
sending the first PCC rule;
receiving, by a gateway device, the first PCC rule from the PCRF entity; and
executing, by the gateway device, the first PCC rule.

8. The method according to claim 7, wherein the NAT entry information comprises a source IPv6 address, a source IPv4 address, a protocol type, a private network source port number before translation, and a public network source port number after translation.

9. The method according to claim 7, wherein the NAT entry information is forwarded by an application function (AF) device.

10. The method according to claim 7, wherein the NAT entry information is forwarded by the gateway device.

11. A communications method comprising:
generating, by a policy and charging rules function (PCRF) entity, a first policy and charging control (PCC) rule;
sending, by the PCRF entity, the first PCC rule, wherein the first PCC rule comprises an Internet Protocol version 4 (IPv4) address of a user equipment (UE);
receiving, by a gateway device, network address translation (NAT) entry information from a NAT device and the first PCC rule from the PCRF entity;
translating the first PCC rule into a second PCC rule according to the NAT entry information, wherein the second PCC rule comprises an Internet Protocol version 6 (IPv6) address of the UE; and
executing the second PCC rule.

12. The method according to claim 11, wherein the NAT entry information comprises a source IPv6 address, a source IPv4 address, a protocol type, a private network source port number before translation, and a public network source port number after translation.

* * * * *